United States Patent [19]

Masaki

[11] Patent Number: 4,719,090

[45] Date of Patent: Jan. 12, 1988

[54] POROUS STRUCTURE FOR FLUID CONTACT

[75] Inventor: Hideyuki Masaki, Gifu, Japan

[73] Assignee: NGK Insulators, Ltd., Aichi, Japan

[21] Appl. No.: 703,483

[22] Filed: Feb. 20, 1985

[30] Foreign Application Priority Data

Feb. 28, 1984 [JP] Japan .................. 59-36908

[51] Int. Cl.[4] ............................................. B01D 53/36
[52] U.S. Cl. ....................................... 422/310; 261/95;
261/113; 422/171; 422/180; 422/191; 502/527
[58] Field of Search ............... 422/171, 177, 179, 180,
422/191, 193; 261/95, 108, 110, 112, 113;
502/527

[56] References Cited

U.S. PATENT DOCUMENTS

| | | | |
|---|---|---|---|
| 2,730,434 | 1/1956 | Houdry | 422/191 |
| 2,911,204 | 11/1959 | Malone | 261/95 |
| 3,466,151 | 9/1969 | Sicard et al. | 422/191 |
| 3,523,681 | 8/1970 | Jaye | 261/95 |
| 3,785,620 | 1/1974 | Huber | |
| 3,825,460 | 7/1974 | Yoshikawa et al. | 502/527 |
| 3,853,485 | 12/1974 | Hogan | 502/527 |
| 4,207,202 | 6/1980 | Cole, Jr. | 422/133 |
| 4,532,086 | 7/1875 | Plus | |

FOREIGN PATENT DOCUMENTS

| | | | |
|---|---|---|---|
| 0070921 | 9/1981 | European Pat. Off. | |
| 2134377 | 12/1972 | France | |
| 54-2615 | 2/1979 | Japan | 422/180 |
| 2068256 | 8/1981 | United Kingdom | 502/527 |

Primary Examiner—Michael S. Marcus
Attorney, Agent, or Firm—Parkhurst & Oliff

[57] ABSTRACT

A porous structure through which at least one fluid flows, consisting of a plurality of honeycomb blocks each of which has partition walls defining a multiplicity of parallel channels. The plurality of honeycomb blocks adjacently located in stacked packings, the stacked packings being superposed on each other such that the parallel channels formed in honeycomb blocks in two superposed stacked packings communicate with each other. The parallel channels in one of the honeycomb blocks are inclined with respect to the parallel channels in the corresponding honeycomb blocks such that the honeycomb blocks cooperate to form a multiplicity of zigzag fluid passages extending through the porous structure.

7 Claims, 2 Drawing Figures

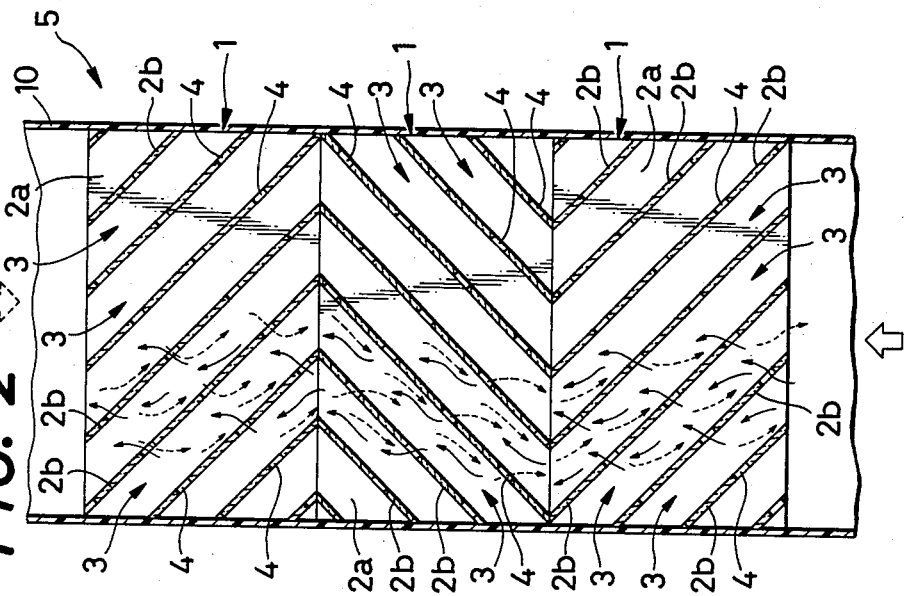
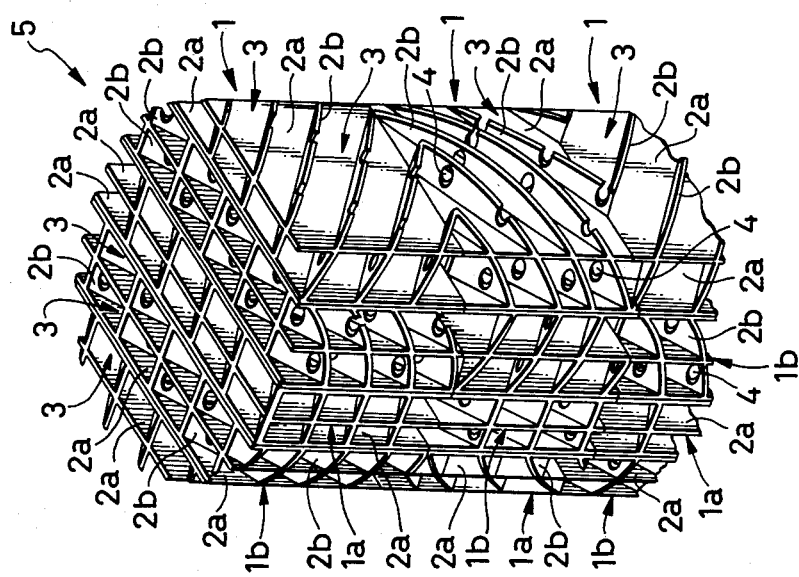

POROUS STRUCTURE FOR FLUID CONTACT

BACKGROUND OF THE INVENTION

The present invention relates to a porous structure used in inter-fluid contact equipment to achieve contact between gases, between liquids or between gas and liquid, for various industrial purposes, such as packed towers for distillation, absorption, cooling and stripping. The invention further relates to a porous structure used for contact between fluid and catalyst.

In the art of such inter-fluid or fluid-catalyst contactors for various industrial applications, different types of packings have been used to fill towers or columns for intended chemical processings. These packings, which are made of ceramics, glass, synthetic resin or metal, are dumped into a tower in random or in an irregular fashion in the form of beads, pellets, rings (cylinders), sheets, and so forth. Alternatively, the packings are arranged in the tower in a regular or stacked fashion in the form of grids or honeycombs. Although the irregular dumping method permits easy filling of the tower with the packings, it suffers a loss of pressure of the fluids flowing through the irregularly dumped packings. In view of this inconvenience, regularly stacked packings in the form of grids, honeycombs, etc. have been dominantly used in recent years, for minimum pressure loss of the fluids, notwithstanding comparatively time-consuming filling of the tower with such regularly stacked packings.

In the case where a tower is filled with known regularly stacked packings of a grid or honeycomb type, it is a common practice that the fluid flow channels formed through the packings are generally oriented substantially in parallel to the line of flow of the fluid through the tower. As a result, the pressure loss encountered with this regular arrangement is less than that experienced on pellet-type packings or other irregularly dumped packings. However, the stacked packings suffer a relatively low frequency of collision between liquid and gas, which results in a local blow or channelling of the gas without contacting the liquid, thus reducing the liquid-gas contact efficiency.

Similar inconveniences are also experienced in the case where such packings are used to fill a tower through which a gas or liquid is caused to flow for contact with a catalyst supported on the packings, in order to catalyze such a fluid during its flow through the tower.

SUMMARY OF THE INVENTION

It is accordingly an object of the present invention to provide an improved porous structure for inter-fluid or fluid-catalyst contact, which permits reduced fluid pressure loss, and improved efficiency of contact between fluids, or between fluid and catalyst.

According to the invention, there is provided a porous structure through which at least one fluid flows, consisting of a plurality of honeycomb blocks each of which has partition walls defining a multiplicity of parallel channels, characterized in that the plurality of honeycomb blocks are superposed on each other in a first direction such that the parallel channels formed in one of the plurality of honeycomb blocks communicate with the corresponding parallel channels formed in another of the plurality of honeycomb blocks which is adjacent to said one honeycomb block, the parallel channels in said one honeycomb block being inclined with respect to the corresponding parallel channels in said another honeycomb block such that the parallel channels formed in the plurality of honeycomb blocks cooperate to form a multiplicity of zigzag fluid passages extending through the porous structure.

The porous structure constructed as described above, provides complicated fluid paths consisting of the zigzag fluid passages formed in the plurality of honeycomb blocks. The zigzag fluid passages cause zigzag upward and/or downward flow(s) of a fluid or fluids, and permit results in an increased probability of inter-fluid or fluid-catalyst contact and collision, thereby increasing the efficiency of gas-liquid contact, and assuring uniform distribution of the fluid(s).

According to one embodiment of the invention, the partition walls of each honeycomb block comprise a plurality of first partition walls which are disposed in a spaced-apart relation with each other in a second direction perpendicular to the first direction in which the honeycomb blocks are superposed on each other. The partition walls further comprise a plurality of second partition walls which are inclined with respect to said first direction, and which connect the spaced-apart first partition walls so as to define the multiplicity of parallel channels.

In one form of the above embodiment, the second partition walls have perforations formed through their thickness so that the adjacent parallel channels in each honeycomb block communicate with each other through these perforations.

The first partition walls may be substantially parallel to each other. Further, the second partition walls may be substantially perpendicular to planes of the first partition walls.

Generally, the angle of inclination of the second partition walls with respect to the vertical direction is held within a range of 45–75 degrees.

According to another form of the above embodiment, each honeycomb block consists of honeycomb sub-blocks of a plurality of kinds disposed in said second direction. In this instance, the second partition walls of each honeycomb sub-block of one of the plurality of kinds are inclined in one direction with respect to said first direction, while the corresponding second partition walls of each honeycomb sub-block of another kind are inclined in another direction which is different from said one direction. The partition walls of the honeycomb sub-blocks of said one and another kinds may be formed such that said one direction of inclination intersects said another direction of inclination. In one form of this arrangement, each honeycomb block consists of two kinds of honeycomb sub-blocks. In this case, each of the honeycomb sub-blocks of one kind are sandwiched by the honeycomb sub-blocks of the other kind.

The above and other objects, features and advantages of the present invention will become more apparent from reading the following detailed description of the preferred embodiment and examples taken in connection with the accompanying drawing.

BRIEF DESCRIPTION OF THE DRAWING

FIG. 1 is a partly cut-away perspective view of one embodiment of a porous structure of the present invention; and FIG. 2 is a partly cut-away view in front elevation of the porous structure of FIG. 2, illustrating zigzag fluid passages and fluid flows through the passages of the structure in use.

DETAILED DESCRIPTION OF THE PREFERRED EMBODIMENT

Referring to FIGS. 1 and 2, the preferred embodiment of the invention will be described in detail.

In the figures, reference numeral 1 designates a plurality of honeycomb blocks which are superposed on each other in a first or vertical direction, and thereby form a porous honeycomb structure 5 which will be described. Each of the honeycomb blocks 1 has first or vertical parallel partition walls 2a, and second or slanted parallel partition walls 2b. The first or vertical partition walls 2a (hereinafter referred to as "vertical partition walls") are spaced apart from each other by a suitable distance in a second or horizontal direction perpendicular to the first or vertical direction in which the honeycomb blocks 1 are superposed on each other. For convenience, these first and second directions are hereinafter referred to as "vertical" and "horizontal" directions, respectively. The second or slant partition walls 2b (hereinafter called "slanted partition walls) are apart from each other by a suitable distance in the first direction. The slanted partition walls 2b connect the vertical partition walls 2a so as to define a multiplicity of parallel channels 3. The slanted partition walls 2b are inclined by a suitable angle with respect to the first direction. Since the second partition walls 2b are inclined, the parallel channels 3 defined by these walls 2b are accordingly inclined with respect to the first direction. Each of the slanted partition walls 2b has a suitable number of perforations 4 through which the adjacent parallel channels 3 are held in communication with each other. The perforations 4 are formed substantially at right angles with respect to the planes of the slanted partition walls 2b, as indicated in FIG. 2.

The honeycomb blocks 1 are made of ceramic materials such as alumina, mullite, silica, and cordierite. Each honeycomb block 1 consists of two kinds of honeycomb sub-blocks 1a and 1b which are disposed so that each sub-block 1a (1b) is sandwiched by the sub-blocks 1b (1a). In this embodiment, each sub-block 1a, 1b consists of the three vertical partition walls 2a, and several slanted partition walls 2b which connect the three vertical partition walls 2a to define the parallel channels 3. The slanted partition walls 2b of the honeycomb sub-block 1a are inclined 45 degrees relative to the vertical direction, such that they extend downwardly from one side of the vertical partition walls 2a to the other side. On the other hand, the slanted partition walls 2b of the honeycomb sub-block 1b are also inclined 45 degrees with respect to the vertical direction such that they extend downwardly from said other side to said one side of the vertical partition walls 2a. Thus, the direction of inclination of the slanted partition walls 2b of the sub-blocks 1a intersects the direction of inclination of the same of the sub-block 1b, and the centerline of each perforation is inclined at 45 degrees with respect to the horizontal and vertical directions. The honeycomb sub-blocks 1a and 1b are integrally assembled into each honeycomb block 1.

The thus constructed plurality of honeycomb blocks 1 are superposed on each other in the vertical direction to obtain the porous honeycomb structure 5, such that the parallel channels 3 formed in one of the plurality of blocks 1 communicate with the corresponding parallel channels 3 in an adjacent block 1, and such that the parallel channels 3 in the plurality of honeycomb blocks 1 cooperate to form a multiplicity of zigzag fluid passages (3) extending through the porous honeycomb structure 5, as shown in FIG. 2.

The porous structure 5, to be obtained in the above-indicated manner, may be circular or polygonal in cross section. In this illustrated embodiment, the vertical partition walls 2a are parallel to each other, as previously indicated, and the slanted partition walls 2b are perpendicular to the planes of the vertical partition walls 2a. Consequently, the parallel channels 3 have a square cross sectional shape. However, the cross sectional shape of the parallel channels 3 may be circular, triangular, hexagonal or other polygonal shapes. Although the parallel channels 3 (slanted partition walls 2b) are inclined 45 degrees with respect to the vertical direction, they may take other suitable angles, preferably within a range of 45-75 degrees.

The porous honeycomb structure 5 which is constructed as described hitherto, is installed in a fluid-contact column 10 of a packed tower, as shown in FIG. 2. Stated more specifically, a plurality of the honeycomb blocks 1 each having a multiplicity of the parallel channels 3 defined by the vertical and slanted partition walls 2a, 2b, are superposed on each other such that the parallel channels 3 of one block 1 are connected at right angles to the corresponding parallel channels 3 of the adjacent block(s) 1 so as to define multiple continuous zigzag fluid passages (3) which extend through the honeycomb structure 5, i.e., through the column 10. In other words, the complicated zigzag fluid passages are formed in the column 10 simply by inserting the honeycomb structure 5 into the column 10. The zigzag arrangement of the fluid passages (3) cause changes in the direction of upward and downward flow of the fluids, thereby increasing the efficiency of contact between the fluids during their upward and downward flows, and permitting uniform distribution of the fluids. Further, the instant honeycomb structure 5 does not suffer a problem of local blow or channelling of a gas without contacting a liquid, which is experienced on a conventional arrangement of known honeycomb packings in a tower wherein the packings are regularly stacked with gaps or clearances left therebetween. Furthermore, the instant honeycomb structure 5 suffers a reduced pressure loss of the fluids, as compared to conventional irregularly dumped packings in the form of beads, pellets, or the like. That is, the honeycomb structure 5 permits uniform velocity of flow of the fluids throughout the column 10.

A still further advantage of the instant porous honeycomb structure 5 is derived from the provision of the perforations 4 which are formed through the thickness of the slanted partition walls 2b in order to allow fluid communication between the adjacent parallel channels 3. These perforations 4 cooperate with the zigzag fluid passages (3) to provide a considerably complicated network of fluid paths, and consequently contribute to an additional increase in the contact efficiency of the fluids.

Even if a fluid is not evenly distributed in the parallel channels (zigzag passages) 3 upon entry of the fluid at one end of the column 10, the fluid is evenly distributed into the individual channels 3 through the performations 4 while the fluid is caused to flow through the honeycomb structure 5 toward the other end. The efficiency of contact between this fluid and the other fluid is further increased by the respective flow of the fluids through the perforations between the adjacent parallel channels or fluid passages 3. In addition, the provision of the perforations 4 eliminates the need for providing the packed tower with a device for uniform or even dispersion or distribution of the fluids. In this embodiment, each of the honeycomb blocks 1 is prepared by assembling the sub-blocks 1a, 1b into an integrally bonded unit. This preassembling of the sub-blocks 1a, 1b into each honeycomb block 1 facilitates the procedure to fill the column 10 with the individual blocks 1 that eventually form the porous honeycomb structure 5.

Two examples of the above-disclosed embodiment will be described, in comparison with known packings.

EXAMPLE 1

A starting honeycomb structure was formed so that the vertical and slanted partition walls 2a, 2b define parallel channels 3 of a square cross sectional shape having a cross sectional area which corresponds to that of a 9 mm-diameter circle, and with the following dimensions: 30 mm in depth between the outermost two vertical partition walls 2a; 150 mm in width of the vertical partition walls 2a; and 500 mm in height of the walls 2a, which is the length of the parallel channels 3. The vertical and slanted partition walls 2a, 2b have a thickness of 0.8 mm, and each of the slanted partition walls 2b is formed with 6 mm-diameter perforations which are spaced apart from each other by a distance of 18 mm. The starting honeycomb structure was then cut at an angle of 45 degrees with respect to the direction of length of the parallel channels 3, at intervals of 50 mm, to obtain honeycomb sub-blocks 1a, 1b having the parallel channels 3 which are inclined at an angle of 45 degrees to their top and bottom. Each of the sub-blocks has a depth of 30 mm, a width of 212 mm, and a height of 50 mm. A plurality of these sub-blocks were bonded together at their vertical partition wallls 2a, so that the directions of inclination of the adjacent sub-blocks 1a and 1b cross each other, as shown in FIG. 1. The bonded assembly of the sub-blocks 1a, 1b was then cut so as to prepare a cylndrical honeycomb block 1 which has a diameter of 100 mm and a height of 50 mm. In the same manner, a number of cylindrical honeycomb blocks 1 were produced. Twelve honeycomb blocks 1 were superposed on each other to obtain a porous honeycomb structure 5 which has zigzag fluid passages consisting of the parallel channels 3 formed in the individual cylindrical honeycomb blocks 1, as indicated in FIG. 2.

The honeycomb structure 5 was inserted into a fluid-contact column of a packed tower, and a stream of air containing about 1000 ppm of ammonia ($NH_3$) was introduced into the packed column through the inlet at the bottom of the column. Water was introduced at the top of the column at a rate of 6000 kg/cm$^2$/hr. so that the water flowing down the column contacts the up-flowing air in a countercurrent manner. Measurements were made of pressure loss and absorption efficiency of ammonia, and the obtained measurements were compared with the corresponding data obtained on known Raschig rings which were placed in a similar fluid-contact column. Each of the Raschig rings used had an ouside diameter of 38.1 mm (1.5 inch), an inside diameter of 25.4 mm (1 inch), a wall thickness of 6.35 mm (¼ inch), and a height of 38.1 mm (1.5 inch). The results of measurements are listed in Table 1 below.

TABLE 1

| | Air Flow Rate (m/s) | Pressure Loss (mmAq/m) | Absorption Efficiency of Ammonia (%) |
|---|---|---|---|
| Instant Porous | 1 | 15 | 97 |
| Structure | 2 | 65 | 92 |
| Comparative | 1 | 55 | 88 |
| Raschig Rings | 2 | 250 | 84 |

The analysis of the above table reveals that the pressure loss of the instant porous honeycomb structure is less than about one fourth of that of the known Raschig rings, and shows 8-9 percent increase in efficiency of ammonia absorption of the instant honeycomb structure over the Raschig rings.

EXAMPLE 2

Honeycomb blocks 1 having parallel channels 3 inclined at an angle of 65 degrees with respect to the vertical direction were prepared by cutting a starting honeycomb structure similar to that used in EXAMPLE 1. Twenty honeycomb blocks 1 were stacked on each other, to form a honeycomb structure 5 of a total height of 1000 mm, in a 100 mm-diameter column of a distillation tower. The bottom portion of the packed column was charged with a mixture of benzene and toluene in a molar ratio of 1 to 3. The mixture liquid was vaporized by heating with a steam, so that the gaseous mixture was caused to flow upward through the honeycomb structure 5. The gas emitting from the top portion of the column was liquefied by a condenser, and the liquid was distributed over the top of the honeycomb structure 5. Thus, the distilling operation was effected. The distillation column was heated to maintain the mixture liquid in the bottom portion of the column at about 99° C. Measurements were made of pressure loss, molar fraction of liquid benzene in the bottom portion of the column, and molar fraction of gaseous benzene in the upper portion of the column. The obtained measurements were compared with the corresponding data obtained on the known Raschig rings of the dimensions specified previously in relation to EXAMPLE 1. The results of measurements are listed in Table 2 below.

TABLE 2

| | Air Flow Rate (m/s) | Pressure Loss (mmAq/m) | Molar Fraction of Benzene | |
|---|---|---|---|---|
| | | | Liquid | Gaseous |
| Instant Porous | 1 | 16 | 0.26 | 0.95 |
| Structure | 2 | 64 | 0.25 | 0.89 |
| Comparative | 1 | 57 | 0.24 | 0.84 |
| Raschig Rings | 2 | 260 | 0.26 | 0.77 |

The analysis of the above table reveals that the pressure loss of the instant porous structure is less than about one fourth of that of the known Raschig rings, and shows about 0.11 to 0.12 increase in molar fractions of gaseous benzene in the upper portion of the packed column.

As is apparent from the foregoing description, the porous honeycomb structure according to the present invention permits an extreme reduction in loss of fluid pressure, considerable improvement in efficiency of inter-fluid or fluid-catalyst contact, and uniform velocity of fluid flow through the fluid-contact column. The instant porous structure which demonstrates these excellent characteristics sweeps away the drawbacks of the conventional packings for inter-fluid or fluid-catalyst contact, and makes a significant contribution to developments of the industry concerned.

What is claimed is:

1. A porous structure through which at least one fluid flows, comprising:
    a plurality of stacked packings, each stacked packing including a plurality of adjacently located honeycomb blocks, each honeycomb block comprising:
    a plurality of first partition walls extending in a first direction and having a longitudinal axis, each of said first partition walls being spaced apart from each other in a second direction which is substantially perpendicular to said first direction, and said plurality of first partition walls being in a substantially parallel relationship;
    a plurality of second partition walls extending in said second direction, such that each second partition wall contacts two adjacent first partition walls along a substantial length of each of said second partition walls, said second partition walls being spaced apart from each other and being inclined relative to said longitudinal axis of the first partition walls, said first and second partition walls cooperating to form a plurality of inclined parallel channels in each honeycomb block; and
    said adjacently located honeycomb blocks in each of said stacked packings having all longitudinal axes of the first partition walls of each honeycomb block in a substantially parallel relationship with each other and said inclined parallel channels of adjacent honeycomb blocks are inclined with regard to each other, and when said packings are superposed, inclined channels of honeycomb blocks in a first packing communicate with inclined channels of corresponding honeycomb blocks in a second packing in a zigzag manner, thereby forming a plurality of zigzag fluid passages through the porous structure.

2. The porous structure of claim 1, wherein said second partition walls have perforations formed through the thickness thereof, said inclined parallel channels in said each honeycomb block communicating with each other through said perforations to result in a substantially even distribution of fluid in said plurality of inclined parallel channels.

3. The porous structure of claim 1, wherein said plurality of honeycomb blocks comprise at least two differently shaped blocks oriented in said stacked packing in an alternating arrangement.

4. The porous structure of claim 1, wherein said second partition walls are inclined at an angle of 45-75 degrees with respect to said longitudinal axis of the first partition walls.

5. A porous structure through which at least one fluid flows, comprising:
    a plurality of stacked packings, each stacked packing including a plurality of adjacently located honeycomb blocks, each honeycomb block comprising:
    a plurality of first partition walls extending in a first direction and having a longitudinal axis, each of said first partition walls being spaced apart from each other in a second direction which is substantially perpendicular to said first direction, and said plurality of first partition walls being in a substantially parallel relationship;
    a plurality of second partition walls extending in said second direction, such that each second partition wall contacts two adjacent first partition walls along a substantial length of each of said second partition walls, said second partition walls being spaced apart from each other and being inclined relative to said longitudinal axis of the first partition walls at an angle of 45-75 degrees, said first and second partition walls cooperating to form a plurality of inclined parallel channels in each honeycomb block and said second partition walls have perforations formed through the thickness thereof to result in a substantially even distribution of fluid in said plurality of inclined parallel channels; and
    said adjacently located honeycomb blocks in each of said stacked packings having all longitudinal axes of the first partition walls of each honeycomb block in a substantially parallel relationship with each other and said inclined parallel channels of adjacent honeycomb blocks are inclined with regard to each other, and when said packings are superposed, inclined channels of honeycomb blocks in a first packing communicate with inclined channels of corresponding honeycomb blocks in a second packing in a zigzag manner, thereby forming a plurality of zigzag fluid passages through the porous structure.

6. The porous structure of claim 5, wherein the perforations in said second partition walls permit said inclined parallel channels to communicate with each other.

7. The porous structure of claim 5, wherein said plurality of honeycomb blocks comprise at least two differently shaped blocks oriented in said stacked packing in an alternating arrangement.

* * * * *